United States Patent
Zitzler et al.

(10) Patent No.: US 8,418,680 B2
(45) Date of Patent: Apr. 16, 2013

(54) GAS GUIDE SYSTEM FOR A COMBUSTION ENGINE, A COMBUSTION ENGINE AND A METHOD FOR OPERATING THE ENGINE

(75) Inventors: Günter Zitzler, Kressbronn (DE); Werner Kasper, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 419 days.

(21) Appl. No.: 12/806,104

(22) Filed: Aug. 5, 2010

(65) Prior Publication Data
US 2011/0030662 A1  Feb. 10, 2011

(30) Foreign Application Priority Data

Aug. 7, 2009 (DE) .......................... 10 2009 028 354

(51) Int. Cl.
*F02M 25/07* (2006.01)
*F02B 47/08* (2006.01)

(52) U.S. Cl.
USPC ..................... 123/568.12; 123/481; 123/562

(58) Field of Classification Search ............. 123/568.12, 123/568.21, 559.1, 559.2, 562, 563, 564, 123/481, 198 F, 325, 332; 701/108, 112; 60/605.1, 605.2, 598, 599, 602
See application file for complete search history.

(56) References Cited

U.S. PATENT DOCUMENTS

| | | | | |
|---|---|---|---|---|
| 6,006,733 A * | 12/1999 | Oleksiewicz | ............. | 123/568.26 |
| 2002/0112478 A1* | 8/2002 | Pfluger | ........................... | 60/612 |
| 2005/0028523 A1* | 2/2005 | Nishiyama et al. | .......... | 60/605.1 |
| 2007/0074513 A1* | 4/2007 | Lamb et al. | ..................... | 60/612 |
| 2007/0295001 A1* | 12/2007 | Newman | ....................... | 60/280 |
| 2008/0314028 A1* | 12/2008 | Christner et al. | ............... | 60/286 |
| 2009/0038293 A1* | 2/2009 | Miyashita | ....................... | 60/287 |

FOREIGN PATENT DOCUMENTS

| | | |
|---|---|---|
| DE | 36 05 255 | 8/1987 |
| DE | 42 39 357 | 12/1993 |
| DE | 103 33 933 | 2/2005 |

* cited by examiner

*Primary Examiner* — Mahmoud Gimie
(74) *Attorney, Agent, or Firm* — Klaus J. Bach

(57) ABSTRACT

In a gas guide system, a combustion engine and a method for operating the engine comprising a gas supply arrangement for supplying gas to the engine, a gas discharge system including an exhaust gas treatment unit for releasing gas from the engine, the gas guide system including a first partial gas discharge line for discharging a first partial gas stream from a first fired cylinder group via the exhaust gas treatment unit and a second gas discharge line for discharging a second partial gas stream from a second unfired cylinder group separately from the hot gas stream directed through the exhaust gas treatment unit to keep it at operating temperatures.

18 Claims, 7 Drawing Sheets

GAS GUIDE SYSTEM FOR A COMBUSTION ENGINE, A COMBUSTION ENGINE AND A METHOD FOR OPERATING THE ENGINE

BACKGROUND OF THE INVENTION

The invention relates to a gas guide system for a periphery of an internal combustion engine comprising: an upstream gas supply structure for supplying gas to the internal combustion engine, a downstream guide structure including an exhaust gas treatment system for conducting gases away from the engine and a first gas outlet structure for the removal of a first partial gas stream from at least one cylinder of a first group of cylinders and also a second gas outlet structure for the removal of a second partial gas stream from at least one cylinder of a second group of cylinders, wherein, in case of a partial operation of the internal combustion engine, that at-least one cylinder of the first group of cylinders is designed for operation with fuel injection and the at-least one cylinder of the second group of cylinders is designed for operation without fuel injection. The Invention further resides in a combustion power generation system including a combustion engine with a gas guide system arranged in the periphery of the engine for guiding the gas through the engine. Furthermore, the present invention resides in a method for operating a combustion power plant with a gas guide system for the periphery of the combustion power plant for guiding gas to and from the power plant, comprising the steps of: supplying as to a supply side of the combustion power plant, conducting gas away from the combustion power plant via an exhaust gas treatment system, removing a first partial gas stream from at least one cylinder of a first group of cylinders, and removing a second partial gas stream from at least one cylinder of a second group of cylinders wherein, during a partial operation of the combustion power plant, the at least one cylinder of the first group of cylinders is operated with fuel injection and the at least one cylinder of the second group of cylinders is operated without fuel injection.

Such a method for the operation of a combustion power plant, such as an engine and, in particular, a large diesel engine may include a gas guide system for the periphery of the engine as referred to initially. For example, under low load or in idle, an engine may be operated partially wherein the fuel injection into some cylinders or cylinder groups, for example, a whole cylinder bank, may be shut down. This partial engine operation is also designated as ZA operation (cylinder out). The cylinders not provided with fuel injection are also called non-fired or unfired cylinders. The cylinders provided with fuel injection are called fired cylinders. A cylinder designed for operation with fuel injection includes an injector which is operative during full and partial engine operation for the injection of fuel. A cylinder designed for operation without fuel injection includes an injector which is controlled to inject fuel during full engine operation but to inject no fuel during partial engine operation. The partial operation of the engine has the advantage that, for the same effective power output of the engine, correspondingly more fuel is injected into the fired cylinders so that the same effective power output is achieved as with full engine operation. During the full engine operation all the cylinders of the engine are fired that is fuel is injected into all cylinders.

During partial engine operation, the temperature of the exhaust gas reaching the exhaust gas treatment system differs from the exhaust gas temperature during full engine operation because the hot exhaust gas from the fired cylinders is mixed with comparatively cold gas—actually comparatively cold compressed air—of the unfired cylinders. In modern Diesel engines equipped with a conventional exhaust gas guide structure, it has in particular been found that, during idle or low load operation, that is, during partial load operation, the exhaust gas temperature is too low for an effective exhaust gas treatment. As a result of the mixing of the hot exhaust gas of fired cylinders and comparatively cold exhaust gas of the non-fired cylinders, the exhaust gas temperature is actually so low that the downstream exhaust gas treatment system is not sufficiently hot to be effective during partial engine operation.

An exhaust gas treatment system may include for example a particle filter (PDF) called also a soot particle filter (RPF) or a Diesel particle filter (DPF) and in particular a catalytically reactive particle filter (CPF). Such particle filter operate for example according to the CRT principle (CRT=Continuous Regeneration Trap). Catalytically or otherwise regenerated particle filters (PF) require for the regeneration generally a certain minimum temperature. Similar minimum temperature requirements exist for catalytic converters used in exhaust gas treatment systems, for example, for oxidation catalytic converters, SCR catalytic converters (Selective Catalytic Reaction), three-way catalysts, $NO_x$ storage catalysts or other similar suitable vehicle catalytic converters.

It is desirable to keep the exhaust gas temperature in the exhaust gas treatment systems sufficiently high also during partial engine operation so that its effectiveness is increased without an increase in fuel consumption.

Conventional technical measures increase the temperature in the exhaust gas treatment systems actively in order to increase the effectiveness of the exhaust gas treatment systems.

DE 10 333 933 A1, for example, discloses a method and an arrangement for controlling an internal combustion engine wherein the emissions of the combustion engine in the exhaust gas are detected. Depending on the comparison of the detected emissions with a desired value, a control value pertinent to the combustion in the combustion engine is corrected. The control valve is for example the air flow volume to the engine. Such a supply air side throttling of the engine usually results in a noticeably increased fuel consumption and a reduced power output of the engine.

DE 42 39 357 C1 discloses a method for the thermal regeneration of a particle filter for the exhaust gas of a Diesel engine wherein, during partial load operation, the exhaust gas temperature is increased by heating using electrical energy to such a degree that auto-ignition of the combustible exhaust gas components collected in the particle filter is achieved. Such a method however results in an increased fuel consumption.

DE 36 05 255 discloses a method for the regeneration of exhaust gas filter systems wherein the cylinder or, respectively, group of cylinders to which the particle filter to be regenerated is assigned is supplied with the amount of fuel or fuel air mixture needed for the regeneration of the filter. Such a method uses for example retarding of the main fuel injection or one or several follow-up injections by which the exhaust gas temperature is increased but also the fuel consumption is noticeably increased. A late engine internal fuel injection may also cause fuel to reach the engine oil and thereby detrimentally affect the engine lubrication.

It would be desirable if the disadvantages of the state of the art, particularly an increase of the fuel consumption and/or the danger of a fuel seepage into the engine oil could be limited. But it should still be possible to provide for a reliable and, comparatively, simple exhaust gas treatment in an exhaust gas treatment system of an engine.

It is therefore the object of the present invention to provide a gas guide system, a combination engine system, and a method for operating a combustion engine system with a gas guide system for the periphery of a combustion engine, with improved exhaust gas treatment capability. In particular, the improvement should result in a reliably operating exhaust gas treatment system also during partial engine operation, preferably by keeping the exhaust gas temperatures comparatively high during partial engine operation. Specifically, the exhaust gas treatment system should be capable of operating as effectively as possible also during partial engine operation.

SUMMARY OF THE INVENTION

In a gas guide system, a combustion engine and a method for operating the engine comprising a gas supply arrangement for supplying gas to the engine, a gas discharge system including an exhaust gas treatment unit for releasing gas from the engine, the gas guide system includes a first partial gas discharge line for discharging a first partial gas stream from a first fired cylinder group via the exhaust gas treatment unit and a second gas discharge line for discharging a second partial gas stream from a second unfired cylinder group separately from the hot gas stream directed through the exhaust gas treatment unit to keep the exhaust gas treatment unit at an adequately high operating temperature.

In accordance with the invention, the gas guide system includes a first exhaust gas guide structure and a second exhaust gas guide structure which are interconnected via a communication line provided with a first separating means, which can be closed during partial engine operation. In a particularly preferred embodiment, the second exhaust gas guide structure includes a collection structure which is in communication with a supply section of the gas guide system in such a way that, during partial engine operation, at least a part of the second partial gas stream is supplied to the supply section to return the exhaust gas from the unfired cylinders to the supply section rather than to the exhaust gas treatment system.

Concerning the combustion power system, the gas guide system according to the invention includes a combustion engine which is designed for partial engine operation so that, during partial engine operation, the at least one cylinder of the first group of cylinders is designed for operation with fuel injection and the at least one cylinder of a second group of cylinders is designed for operation without fuel injection and the combustion engine is designed for full engine operation and during full engine operation, the at least one cylinder of the first group of cylinders as well as the at least one cylinder of the second group of cylinders are operated with fuel injection.

Concerning the method according to the invention, it is provided that during partial engine operation, the first and the second partial gas flows are conducted separately. In a preferred embodiment, at least a part of the second gas stream is supplied to a supply section of the gas guide system instead to the exhaust gas treatment system.

It is further provided that at least a part of the second partial gas stream is separately re-circulated to a supply section of the gas guide system. During full engine operation, the at least one cylinder of the first cylinder group with fuel injection and the at least one cylinder of the second cylinder group are both operated with fuel injection and the first partial gas stream and the second partial gas stream are combined.

The present invention is based on the concept that, by way of an increased exhaust gas temperature, the effectiveness of an exhaust gas treatment system can be substantially improved during partial engine operation. To this end, a gas guiding system is proposed which is in contrast to the state of the art. It has been recognized that the mixing of the first partial gas stream and the second partial gas stream also during partial engine operation as it is conventionally practiced can be disadvantageous with regard to the minimum input temperature of the exhaust gas required for the effectiveness of an exhaust gas treatment system.

The at least one cylinder of the second cylinder group is not fired during partial engine operation.

The second cylinder group comprises preferably only cylinders which are not fired during partial engine operation.

The at least one cylinder of the first group of cylinders is fired also during partial engine operation. The first cylinder group comprises advantageously only cylinders which are fired during partial engine operation, or at least mainly fired cylinders. Concerning the last alternative, in certain operating modes also for example a plurality of fired cylinders and a minority of unfired cylinders may be provided for the first group of cylinders. In an extreme case, the first cylinder group may have only one fired cylinder in contrast to only unfired cylinders of the second group. It has been found that, during partial engine operation, the exhaust gas of the first cylinder group has a substantially higher temperature than the discharge air of the second cylinder group. A mixing of the exhaust gas and the discharge air was found to be disadvantageous for the exhaust gas treatment system.

Based on this recognition, the invention proposes essentially that, during partial engine operation, the first partial gas stream and the second partial gas stream are kept separated that is, a communication line between the first and the second gas discharge guide structure is closed by a separation means during partial engine operation. In practice, a gas communication line extending between the first and the second gas discharge conduit in a discharge area of the gas guide system upstream of the exhaust gas treatment system is closed. In this way, a mixing of discharge air from unfired cylinders of a second cylinder group and exhaust gas from fully fired cylinders or at least partially fired cylinders of a first cylinder group is prevented. In this case, the respective gas conducting communication line is blocked preventing a mixing of discharge air and exhaust gas during partial engine operation. The separation means may be in the form of one or several valves, preferably one or more exhaust gas valves and/or exhaust gas recirculation valves. In a preferred embodiment, the gas conducting communication line includes a connection to a gas discharge line.

In addition, in connection with the above-mentioned preferred embodiment of the invention, at least a part of the second partial gas stream is supplied to a supply line of the gas guide system separately from the first partial gas stream instead to the exhaust gas treatment system. In other words, in accordance with the invention, a mixing of the first partial gas stream and the second partial gas stream is essentially prevented during partial engine operation and, additionally, the second partial gas stream is directed to a supply line of the gas guide system. To this end, a supply line is so selected that the temperature of the exhaust gas of the combustion engine in the exhaust gas treatment system is comparatively increased. The gas guide system includes a collection line which extends to a suitably arranged supply line of the gas guide system. In this way, a direct addition of the second partial gas stream to the exhaust gas treatment system is avoided. In particular, the supply line is so arranged that the exhaust gas treatment system is circumvented by the second partial gas stream. The supply line which is connected to the collection line has the purpose of supplying exhaust air from the at least one cylinder of the second cylinder group, which is not fired during partial engine operation, to the gas guide system. This supply line may be so arranged that the discharge air is returned to the combustion engine or exhausted to the ambient, but not supplied to the exhaust gas treatment system, which is bypassed.

With the gas guide system according to the invention, it is ensured that the temperature of the exhaust gas treatment system is relatively high in comparison with an arrangement where the first and second partial gas streams are mixed. The known conventional additional measures may therefore be omitted or limited and the disadvantages associated therewith are therefore essentially avoided or, respectively, limited.

The combustion engine has a supply-side periphery and a discharge-side periphery. The gas supply is arranged at the supply side of the combustion engine. The exhaust gas treatment system is in accordance with the invention part of the discharge-side gas duct of the gas guide system. The first and second gas discharge lines comprise in particular, the manifold or manifolds of a cylinder or a group of cylinders. A cylinder group may, in principle, comprise any number of cylinders, that is, one or several cylinders which form for example a real part of a cylinder bank. The cylinder group may also be formed by a complete cylinder bank that is all the cylinders of a cylinder bank. According to the concept of the invention, a gas discharge structure for the discharge of a partial gas stream comprises at least one cylinder of a cylinder group. A gas discharge communication line between the gas discharge duct and the at least one cylinder of the cylinder group is provided herein.

"Gas" according to the concept of the present invention, is in principle, any operating gas provided to and by the engine (air, charge air, combustion gas, exhaust gas and mixtures thereof) in particular at the discharge side of the combustion engine, with respect to the fired cylinders exhaust gas and with respect to the unfired cylinders discharge air. At the supply side of the combustion engine, the gas supply line of the gas guide system is provided particularly for supplying fresh air and charge air to the engine. There is a fresh air supply line upstream of a compressor and respectively, downstream of a compressor. The gas supply line is also designed for a gas recirculation for re-circulating exhaust or discharge gas back to the combustion engine, specifically, exhaust gas from a fired cylinder or discharge air from an unfired cylinder back to the supply side.

In a preferred embodiment of the invention, the collection line includes a second separation means for interconnecting the second gas discharge line to the supply line during partial engine operation, or respectively, separating the second gas discharge line from the supply line during full engine operation. During partial engine operation, a second separation means in the form of a valve for example is open and is closed during full engine operation. Additionally, the collection line may include a one-way valve. This may be advantageous at a relatively high pressure level in the recirculation line. The valve and/or one-way valve are accordingly gas valves.

The second separation means and/or the check valve provide for a secure closing of the collection line during full engine operation. It is therefore basically impossible that, during full engine operation, exhaust gas from the cylinders which, during partial engine operation, are not fired and discharge only air but are fired during full engine operation, reaches the periphery of the engine or possibly the ambient without being treated. The first and second separation means and/or the check valve advantageously include a connection to the control means, particularly a monitored control means. The control means connection is advantageously connected to an engine control unit.

A first and/or second separation means is advantageously in the form of a valve but not limited to such an embodiment. Basically, it is advantageous to provide a separation means which closes sealingly. Particularly suitable is an exhaust gas valve. Other separation means such as flaps or similar are basically also possible. The first separation means is designed so as to separate the first gas outlet and the second gas outlet during partial engine operation and to joint the first and the second gas outlet during full engine operation. A valve of the first separation means opens for example during full engine operation and closes during partial engine operation. A second separation means operates in the opposite sense. The first and second separation means are advantageously provided with a control means connection for example, an engine control unit or similar.

It is advantageous if, during partial engine operation, only the first exhaust gas line and, during full engine operation, both exhaust gas lines are connected to the exhaust gas discharge line.

There are advantageous further developments of the invention for the realization of the concept according to the invention. This concerns in particular the arrangement of the supply lines in the gas guide systems by which it is made sure that, during partial engine operation, at least part of the second partial gas stream is first supplied to the supply line rather than to the exhaust gas treatment system. As a result, the exhaust gas temperature is increased in comparison with the supplying of a mixture of the first and the second partial gas stream to the exhaust gas treatment system.

In a particularly advantageous development of the invention, the supply line is arranged in the gas supply arrangement. The gas supply line preferably includes a fresh air line section which includes at least one but also two compressors and, if desired more than two compressors. A section of the fresh air line ahead of the first compressor is called a row air pipe and is specifically suitable for forming a supply section. Possibly, the supply section may also be arranged in a charge air duct between a first and a second compressor of the fresh air line. The supply duct may, in a further variant, be arranged also in a charge air line downstream of a first and/or as second compressor.

In a first variant, a supply section with a comparatively low pressure level is integrated into a fresh air supply line. As a result, a counter pressure of the fresh air against the second partial gas stream which is in the form of the discharge air of the unfired cylinders in the collection line is therefore comparatively small.

In an arrangement of a second variant of the supply section after a first and/or a second compressor, it may be advantageous if the counter pressure of the charge air against the discharge air of an unfired cylinder is higher. The first or the second variant can be selected depending on the application in accordance with the counter pressure level in the gas guide system.

In a modification of the second variant, the supply section may be arranged ahead of, or after, a charge air cooler. An arrangement of the supply section after the charge air cooler has the advantage that the exhaust gas temperature can be substantially increased. With the selection of the variants, the actual state of a counter pressure level in the gas guide system can be considered. A counter pressure in the supply section ahead of the charge air cooler against the collection line is higher than a counter pressure present in the supply section if the supply section is arranged after the charge air cooler.

With an increased counter pressure, it has been found to be advantageous to provide in the collection line, in addition to the second separation means, also a check valve. A check valve is advantageous in particularly in connection with the second embodiment since, in comparison to the first embodiment, it has a higher counter pressure level.

In connection with a third variant of the invention, it may also be advantageous to arrange the supply section in the discharge line in a section downstream of the exhaust gas treatment system. It has been found that, in the third variant, a counter pressure in the supply section against the gas contained in the collection line, or more accurately the compressed exhaust air, is relatively low. Therefore, in principle, a check valve may be omitted in the third variant. In this third variant, it has been found to be advantageous if the second separation means in the collection line to the supply section of the gas discharge line includes a monitoring means. Monitoring of the second separation means in the collection line has been found in connection with the third variant to be particularly appropriate for avoiding an undesirable bypassing of the exhaust gas treatment system by the second partial gas stream during fired operation. The second separation means may be monitored for example by the engine control unit. To this end, the second separation means of the third variant includes preferably a monitored control means connection, in particular a monitored control means connection to the engine control unit. A monitored control means connection is designed so as to provide a warning signal and/or initiate countermeasures for eliminating the failure function or limiting the effects thereof.

In a particularly preferred fourth variant, the collection line is part of a gas recirculation of the gas supply line. In particular, in this fourth variant, a gas recirculation line of the gas supply system is utilized during unfired operation of the combustion engine as collection structure for the second partial gas stream. In other words, the gas recirculation line forms at least partially the collection structure. In this connection, it has been found to be particularly advantageous to design the gas recirculation line for connection with at least one cylinder of the second cylinder group which is operated during partial engine operation without fuel injection. The second cylinder group can comprise only a real part of the cylinders of a cylinder bank. In a modification, the second cylinder group may also comprise all the cylinders of the second cylinder bank. In connection with the fourth variant, it is advantageously also possible to form a collection structure as part of an overall gas recirculation, without large constructive changes. This is particularly true if only a real part of the cylinders of a cylinder bank represent the second cylinder group. In this case, one or several of the exhaust gas recirculation valves can be used as first and/or second separation means in the exhaust gas recirculation system.

In particular, in connection with the fourth variant, an exhaust gas recirculation cooler bypass may be part of the collection line. Herein, it is particularly advantageous if the supply section is arranged downstream of an exhaust gas recirculation cooler. This has the advantage that gas, or more accurately compressed discharge air from an unfired cylinder is supplied to the gas recirculation line uncooled and, consequently, effectively contributes to an increase in the exhaust gas temperature. The advantage of the fourth variant, in particular if only an actual part of the cylinders of a cylinder bank is unfired during partial engine operation, resides in the fact that, with the gas recirculation of the gas guide system in effect, no additional valve and no additional collection line is necessary. This modification is particularly advantageous if already a certain part of the cylinders of a cylinder bank in an unfired state is sufficient to ensure a sufficient partial engine operation. Under these operating conditions, the unfired cylinders are also called spender cylinders.

If, in a further modification of the fourth variant, all cylinders of a cylinder bank are to remain unfired during partial engine operation, it is advantageous to provide a collection line for the whole cylinder bank. Then it is advantageous if a first separation means, in addition to an exhaust gas recirculation valve, includes a further gas valve for separating the gas discharge line from the second gas outlet line during partial engine operation. Also, in this modification, advantageously an exhaust gas recirculation cooler bypass is provided as part of the collection line and the supply section is arranged after an exhaust gas recirculation cooler.

All four variants described above and the modifications thereof result in an increase of the temperature of the exhaust gas of the combustion engine at the exhaust gas treatment system and possibly in an increase of the $NO_x$ concentration in the first partial gas stream which flows through the exhaust gas treatment system during partial engine operation. In this way, the effectiveness of the exhaust gas treatment during idle and low-power operation can be substantially improved. This concerns in particular the passive regeneration of particle filters following the CRT principle (Continuous Regenerating Trap).

All the variants of the invention described above as well as their modifications can be realized alone or in combination with one another.

Exemplary embodiments of the invention will be described below with reference to the accompanying drawings.

DESCRIPTION OF THE VARIOUS EMBODIMENTS

Figure 1:
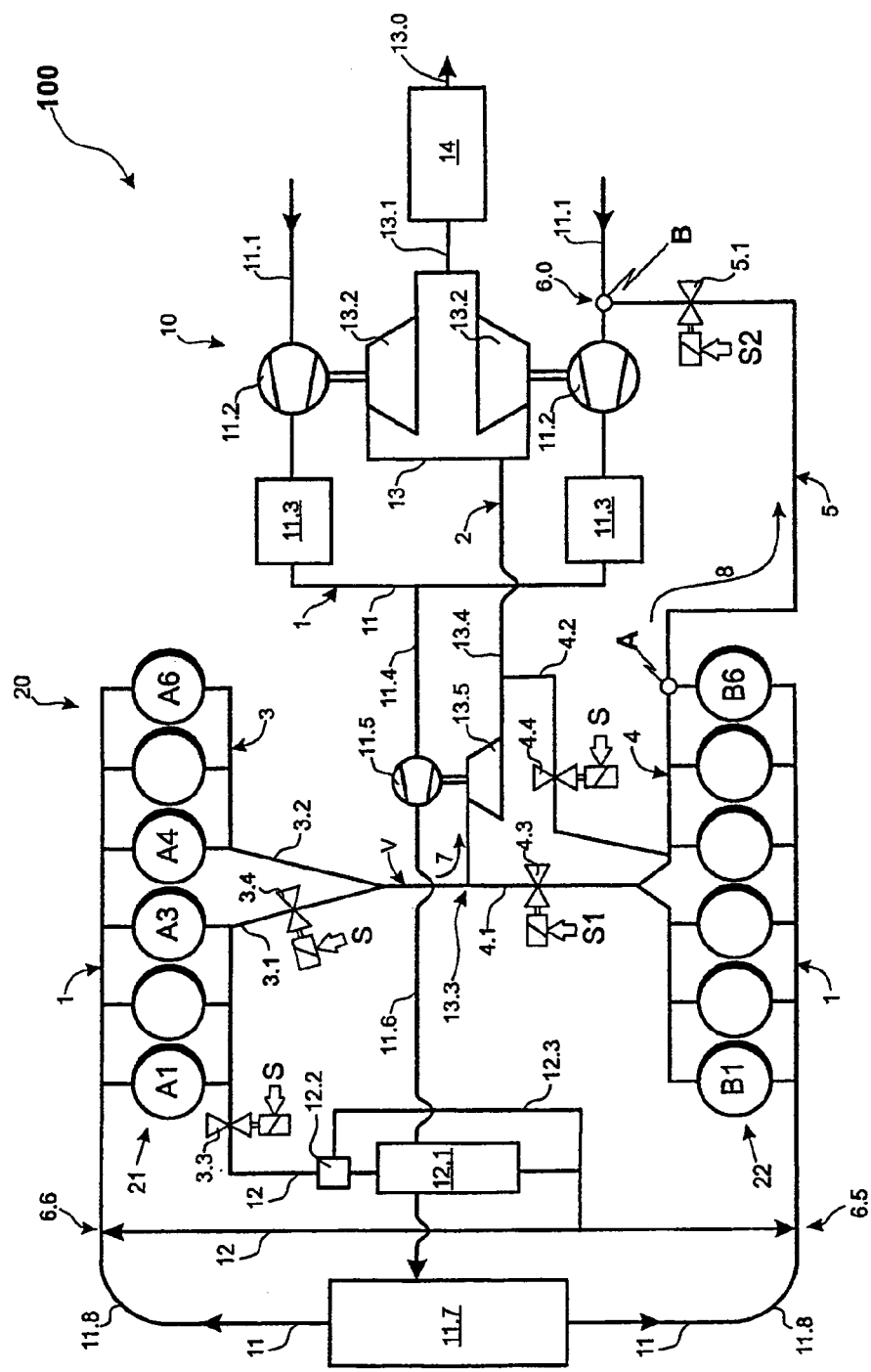
FIG. 1 shows schematically an internal combustion engine including a combustion system with a gas guide system according to a first embodiment of the invention.

In the description, the same reference numerals are used for identical or functionally identical parts in the various figures.

FIG. 1 shows an internal combustion engine system 100 with a gas guide system 10 of a first embodiment of the invention. The gas guide system 10 is arranged at the periphery of an internal combustion engine 20 for guiding gas, that is fresh air as well as exhaust gas to, and from, the engine. The internal combustion engine 20 has a supply-side and an exhaust side periphery. The internal combustion engine which is here in the form of a large Diesel engine is shown schematically. It has a first cylinder bank 21 including cylinders A1 to A6 with a first gas discharge system 3 and a second cylinder bank 22 including cylinders B1 to B6 with a second gas discharge system 4. The gas guide system 10 includes a gas supply side guide arrangement 1 for supplying gas to the inlet side of the internal combustion engine 20. The gas supply arrangement 1 as shown includes a fresh air section 11 and a gas recirculation section for re-circulating exhaust gas or, respectively discharge air, which are both combined further downstream ahead of an input side of the internal combustion engine 20, that is ahead of the cylinder banks 21, 22 to form a common part of the gas supply system 1. The fresh air supply section 11 of the gas supply side guide arrangement 1 is formed initially by a fresh air supply section 11.1 for taking in fresh air arranged ahead of the low pressure compressor 11.2 with a downstream intercooler 11.3. As shown herein two fresh air supply sections 11.1 and two compressors 11.2 and two intercoolers 11.3 are provided. The two fresh air supply sections 11.1 are combined to a common charge air section 11.4 ahead of a high pressure compressor 11.5 to which a further charge air section 11.6 is connected which extends from the high pressure compressor 11.5 to the charge air cooler 11.7. Downstream of the charge air cooler 11.7, there are two further sections 11.8 of the fresh air supply line 11 to which the gas recirculation line 12 is connected.

The compressor, that is, the two low-pressure compressors 11.2 and the high pressure compressor 11.5 are each operated by a turbine 13.2, 13.5 of the exhaust gas discharge line 2. To this end, the two low pressure turbines 13.2 are arranged in a section 13.1 ahead of an exhaust gas treatment system 14 and a high pressure turbine 13.5 is arranged in a section 13.4 between the low pressure turbines 13.2 and a connection 13.3 to the two gas discharge lines 3, 4. The gas discharge lines 3, 4 are connected at the discharge side of the internal combustion engine 20 in each case to cylinders of the cylinder banks 21, 22, that is, in the present case, at the outlet side of the internal combustion engine 20.

The internal combustion engine 20 can be operated in a full engine operating mode (all cylinders are firing) or in a partial engine operating mode (only some of the cylinders are firing). The first cylinder bank 21 with the cylinders A1 to A6 is in the shown embodiment in the form of a fired cylinder bank that is the cylinder A1 to A6 of the cylinder bank 21 are always operated with fuel injection during full engine operation and also during partial engine operation. The second cylinder bank 22 of the internal combustion engine 20 however is designed as an unfired cylinder bank, that is, during partial engine operation of the internal combustion engine 20, the cylinders B1 to B6 of the second cylinder bank 22 are operated without fuel injection. During full engine operation, the cylinders B1 to B6 of the second cylinder bank 22 are operated with fuel injection.

The first gas discharge line 3—comprising the manifold and corresponding structures—serves for conducting a first partial gas stream 7 out of the cylinders A1 to A6 of the first cylinder bank 21 which includes the cylinders fired during full and partial engine operation.

The second gas discharge lien 4—comprising the manifold and corresponding structures—serves for conducting a second partial gas stream 8 out of the cylinders B1 to B6 of the second cylinder bank 22, that is, of the cylinders which remain unfired during partial engine operation. In the shown arrangement in this way a first cylinder group is formed by the cylinders A1 to A6 of the cylinder bank 21 and a second cylinder group is formed by the cylinders B1 to B6 of the second cylinder bank 22. The partial gas streams 7, 8 are indicated in FIG. 1 for partial engine operation.

The first gas discharge line 3 for the fired first cylinder bank 21 includes a first branch 3.1 for the cylinders A1 to A3 which extends to the exhaust gas recirculation line 12 of the gas supply system. This branch 3.1 of the first gas discharge line 3 is also connected to the connection 13.3 of the exhaust gas discharge line 2. For the cylinders A4 to A6, a second branch 3.2 of the first gas discharge line 3 is provided which is also connected to the connection 13.3. The first branch 3.1 of the first gas discharge line 3 includes an exhaust gas recirculation valve 3.3 in a discharge direction toward the recirculation line 12 and an exhaust gas recirculation valve 3.4 in a discharge direction toward the connection 13.3 of the exhaust line 13 of the exhaust gas discharge line 2.

In the exhaust gas recirculation line 12, an exhaust gas recirculation cooler 12.1 is arranged which, depending on the position of a bypass valve flap 12.2, can be bypassed via a bypass line 12.3. That is, exhaust gas discharged from the fired first cylinder bank 21 can flow via the branch 3.1 thereof and the gas recirculation line 12 to the exhaust gas recirculation cooler 12.1 or it can be directed by the bypass flap valve 12.2 to the bypass line 12.3. The bypass line rejoins the exhaust gas recirculation line 12 downstream of the exhaust gas recirculation cooler 12. The second gas discharge line 4 is provided for the discharge of a second partial gas stream 8 from the cylinders B1 to B6 of the second cylinder bank 22. The gas discharge line 4 includes a first branch 4.1 which extends to the connection 13.3 of the exhaust line 13 of the exhaust gas discharge line 2. For bypassing the high-pressure turbine 13.5, the second gas discharge line 4 includes a second branch 4.2, which extends to the exhaust line 13 of the exhaust gas discharge line 2 between the high-pressure turbine 13.5 and the low pressure turbine 13.2, that is, to the line section 13.4.

Both branches 4.1, 4.2 of the second gas discharge line 4 comprise each an exhaust gas valve 4.3 and 4.4. The exhaust gas valve 4.4 in the second branch 4.2 serves as bypass valve. To provide the bypass function for the second branch 4.2 of the second exhaust gas line 4, both exhaust gas valves 4.3 and 4.4 are open. The exhaust gas valve 4.4 and the exhaust gas valve 4.3 serve—in accordance with the invention—as first separation means in the gas-conducting connection V of the first gas discharge line 3 and the second gas discharge line 4. The gas discharge lines 3, 4 are interconnected at the connection 13.3 and/or via the bypass connection in the line section 13.4. During partial engine operation, the exhaust gas valves 4.3, 4.4 separate the first gas discharge line 3 and the second gas discharge line 4. That is, during partial engine operation, the two gas discharge valves 4.3, 4.4 are closed. During full engine operation, a gas valve 5.1 in a collection line 5 is closed. The exhaust gas valve 4.4 can be closed during full engine operation or it may be fully or partially open.

In a further development of the invention, the second gas discharge line 4 is connected to a collection line 5 via a connecting point A. During partial engine operation, the collection line 5 is used for supplying at least a part of the second partial stream 8 in the second gas discharge line 4 to the supply section 6, in the present case via a connecting point B, of the gas guide system 10. The supply section 60 at the connecting point B of the collection line 5 is arranged in accordance with the first variant in the gas supply arrangement 1—in the fresh air supply section 11 thereof, that is in a fresh air supply section 11.1, upstream of a low pressure compressor 11.2 of the fresh air supply section. A second separation means in the form of the gas valve 5.1 is arranged in the collection line 5. The additional separation means is provided to connect during partial engine operation the second gas discharge line 4 via the connecting point A with the supply section 6.0 at the connecting point B. That is, the gas valve 5.1 is open during partial engine operation and is closed during full engine operation.

The operation of the combustion engine system 100 with the combustion engine 20 and the gas guide system 10 is controlled during full engine operation and partial engine operation by controlling the gas flow by means of the exhaust gas recirculation valves 3.3, 3.4 and the exhaust gas valves 4.3, 4.4 and the gas valve 5.1. The exhaust gas recirculation valves 3.3, 3.4 as well as the exhaust gas valves 4.3, 4.4 and the gas valve 5.1—below also called valves—are connected to this end to an engine control unit which controls these valves by means of control values S or, respectively, S1, S2. The valve of the control valves S1, S2 for the exhaust gas valves 4.3, 4.4 and the gas valve 5.1 in accordance with the function of the first and second separation means are explained with reference to FIG. 7.

During full engine operation gas is guided in the gas guide system 10 as follows: When the exhaust gas valve 3.4 is closed and the exhaust gas recirculation valve 3.3 is open the exhaust gases of the cylinder A1 to A3 of the fired first cylinder bank 21 can be conducted back to the inlet side of the combustion engine via the first branch 3.1 of the gas outlet to the recirculation line 12 and then through the further rung of the gas supply arrangement. Herein, the exhaust gas can be conducted either through the exhaust gas recirculation cooler 12.1 and cooled thereby or—by switching the bypass flap valve 12.2—via the bypass line 12.3 and be supplied to the input side of combustion engine 20 without being cooled. The cylinders A1 to A3 of the fired first cylinder bank 21 are also called spender cylinder; the arrangement is called spender gas recirculation and is controlled by the exhaust gas recirculation valves 3.3 and 3.4. For opening and closing, the valves 3.3, 3.4 a control valve S is used.

When the valve 3.3 is closed and the valve 3.4 is open, the exhaust gas from the cylinders A1 to A3—like before also the exhaust gas of the cylinders A4 to A6 of the fired first cylinder bank 21 is conducted via the first gas discharge line 3 and the connection 13.3 of the exhaust line 13 to the downstream-side exhaust gas discharge line 2 and to the turbines 13.5 and 13.2 for driving the turbines. The exhaust gas leaving the turbines 13.2 is conducted through the exhaust gas treatment system 14 and discharged to the ambient via the down-stream line section 13.0. The turbines 13.5 and 13.2 drive the compressor 11.5 and 11.2 for compressing the fresh air in the gas supply arrangement 1.

During full engine operation also the cylinders B1 to B6 of the second cylinder bank 22 are fired, that is, they are operated with fuel injection. During full engine operation of the combustion engine 20, the gas valve 5.1 in the collection line 5 is closed so that no gas reaches the gas supply line 1 via the collection line 5. The valve 4.3 however is opened so that the partial gas stream of the first cylinder bank 21 is supplied via the first gas discharge line 3, and the partial gas stream of the second cylinder bank is supplied via the second gas discharge line 4, to the downstream gas discharge line 2. During full engine operation, with the exhaust gas valve 4.4 closed, and the exhaust gas valve 4.3 open, the partial gas stream of the second cylinder bank 22 can be directed to the high-pressure turbine 13.5.

The partial gas flows of the first and the second cylinder banks 21, 22 are established during partial engine operation in different ways. They are marked in FIG. 1 and also in FIGS. 2-6 by the reference numerals 7 and 8.

During partial engine operation, the gas flow in the gas guide system 10 is advantageously set up as follows: The fuel injection into the cylinders B1 to B6 of the second cylinder bank 22 is shut down. With an, in principle, identical effective power generation of the internal combustion engine combustion engine 20, more fuel is injected into the fired cylinders A1 to A6 of the first cylinder bank 21 so that essentially the same power is provided by the engine during partial engine operation as with full engine operation. This partial engine operation which is designated also as ZA operation (cylinder shut down) provides with the arrangement according to the invention still a sufficiently high exhaust gas temperature for the exhaust gas treatment system 14. This is achieved by the design of the gas guide system 10 and the control of the valves 4.3, 4.4 and 5.1. During partial engine operation, the valves 4.3 and 4.4 are closed so that the first gas discharge line 3 and the second gas discharge line 4 are separated from each other. The valves 4.3, 4.4, which are effective as first separation means block a gas flow connection V between the first gas discharge line 3 and the second gas discharge line 4 and prevent mixing of the fast partial gas stream 7 of the first gas discharge line 3 and the second partial gas stream 8 of the second gas discharge line 4. Rather, the gas of the unfired cylinders B1 to B6 of the second cylinder bank 22—more accurately the compressed hot air—is supplied to the collection line 5 via the connecting point A while the exhaust gas valves 4.3 and 4.4 are closed and the valve 5.1 is open. The second partial gas stream 8 is directed via the collection line 5 and the open valve 5.1 of the supply section 6.0 at the connecting point B to the fresh air supply section 11 of the fresh air supply line 1 of the gas supply arrangement.

Since the first partial gas stream 7 of the first gas discharge line 3 is supplied to the exhaust gas treatment system 14 without mixing with the second partial gas stream 8 of the second gas discharge line 4 a sufficiently high temperature in the exhaust gas treatment system is maintained, or, at least, a temperature reduction is avoided. It is also advantageous that the charge air supplied to the combustion engine 20 via the gas supply arrangement 1 has a higher temperature. The charge air is enriched by the compressed hot air of the cylinder B1 to B6 of the second gas discharge line via the supply section 6.0. The second partial gas stream 8 is supplied to the supply section 6.0 rather then to the exhaust gas treatment system 14.

Figure 2:
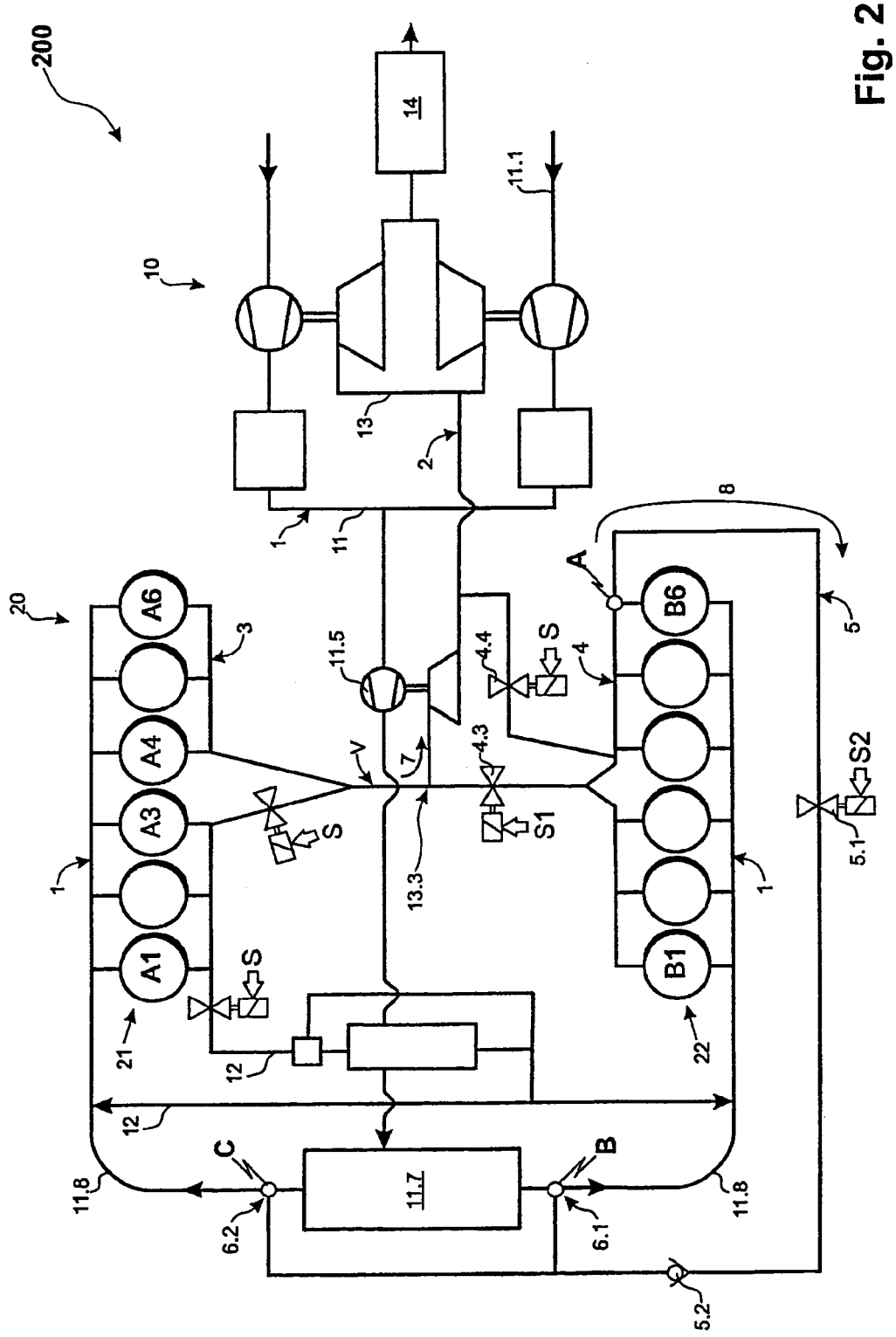
FIG. 2 shows schematically a second embodiment of the invention including a modified gas guide system.

FIG. 2 shows a second embodiment of a combustion engine system 200, which has essentially the same design as the combustion engine system 100 described above but whose arrangement of the collection line 5 is different and which provides for a different supply section 6.1 and 6.2. For a description of the basic functions, the description of FIG. 1 can be used, wherein, as mentioned earlier, for identical components or components with identical or similar functions, the same reference numerals are used for simplicity reasons. Below in particular the differences with respect to the combustion engine system 100 of FIG. 1 are explained.

The combustion engine system 200 also includes a gas guide system 10 at the periphery of the combustion engine 20. The combustion engine comprises a first cylinder group A1, which includes all cylinders A1 to A6 of the fired first cylinder bank 21, and a second cylinder group which includes all the cylinders B1 to B6 of the second cylinder bank 22 which are not fired during partial engine operation.

The gas guide system 10 again includes a supply-side gas supply line 1 as well as an exhaust gas discharge line 2. The gas supply line 1 includes a fresh air supply line 11 as well as a gas recirculation line 12 and a section 13 of the exhaust gas discharge line 2. The respective gas lines 1, 2 include the same components such as compressor, turbines, valves etc. as they have been explained in connection with FIG. 1.

In addition, the first gas discharge line 3 and the second gas discharge line 4 are provided just like in FIG. 1—with the exception of the connecting points B and C—so that full engine operation of the combustion engine system 200 is the same as that of the combustion engine system 100 of FIG. 1.

Different from the combustion power system 100 of FIG. 1, the collection line 5 extends from the connecting point A of the second gas discharge line 4 to supply sections 6.1, 6.2 at two connecting points B and C of the gas supply line 1. In addition, the collection line 5 includes, in addition to the gas valve 5.1, a check valve 5.2.

At the connecting points B, C, the supply section 6.1, 6.2 is arranged in a further fresh air supply section 11.8 of the fresh air supply line 11 of the gas supply arrangement 1. The supply section 6.1 is arranged at the connecting point B and the supply section 6.2 is arranged at the connecting point C downstream of the exit of the charge air cooler 11.7. The pressure level at the connecting points B, C in the area of the supply sections 6.1, 6.2, that is in the section 11.8 which represents a charge air section downstream of the charge air cooler 11.7, is in the combustion engine system 200 generally higher than in the area of a fresh air supply section 11.1. The connecting point B which in FIG. 2 is arranged in the area of the supply section 6.0 is in connection with the combustion power system 100 of FIG. 2 arranged in the area of a fresh air supply section 11.1.

During partial engine operation, the second partial gas stream 8 is conducted from the second gas discharge line 4, by opening of the valve 5.1 and closing of the valves 4.3 and 4.4, to the connecting point B, C of the supply section 6.1, 6.2 and, consequently, into the fresh air supply section 11.8 for the charge air downstream of the high pressure compressor 11.5 and the charge air cooler 11.7. In order to limit a pressure load on the valve 5.1, the collection line 5 includes a check valve 5.2 which opens in downstream direction of the second partial gas stream from A toward B, C. During partial engine operation, the second partial gas stream 8 is mixed after being added to the fresh air supply section 11 possibly with re-circulated exhaust gas from the recirculation line 12 and conducted to the combustion power engine 20, that is, the cylinders of the fired, first cylinder bank 21 and the unfired second cylinder bank 22. By separation of the second partial gas stream 8 from the first partial gas stream 7 by the closed valves 4.3, 4.4 and by the separate supply of compressed discharge air from the unfired first cylinder bank 2.2 to the combustion engine 20 during partial engine operation upon opening of the valves 5.1, 5.2, the temperature of the exhaust gas in the area of the exhaust gas discharge line—and particularly at the exhaust gas treatment system—is higher than with a direct mixing of the first and second partial gas streams 7, 8. With the combustion power system 200, consequently, an effective exhaust gas treatment in the exhaust gas treatment system 14 can be achieved.

Figure 3:
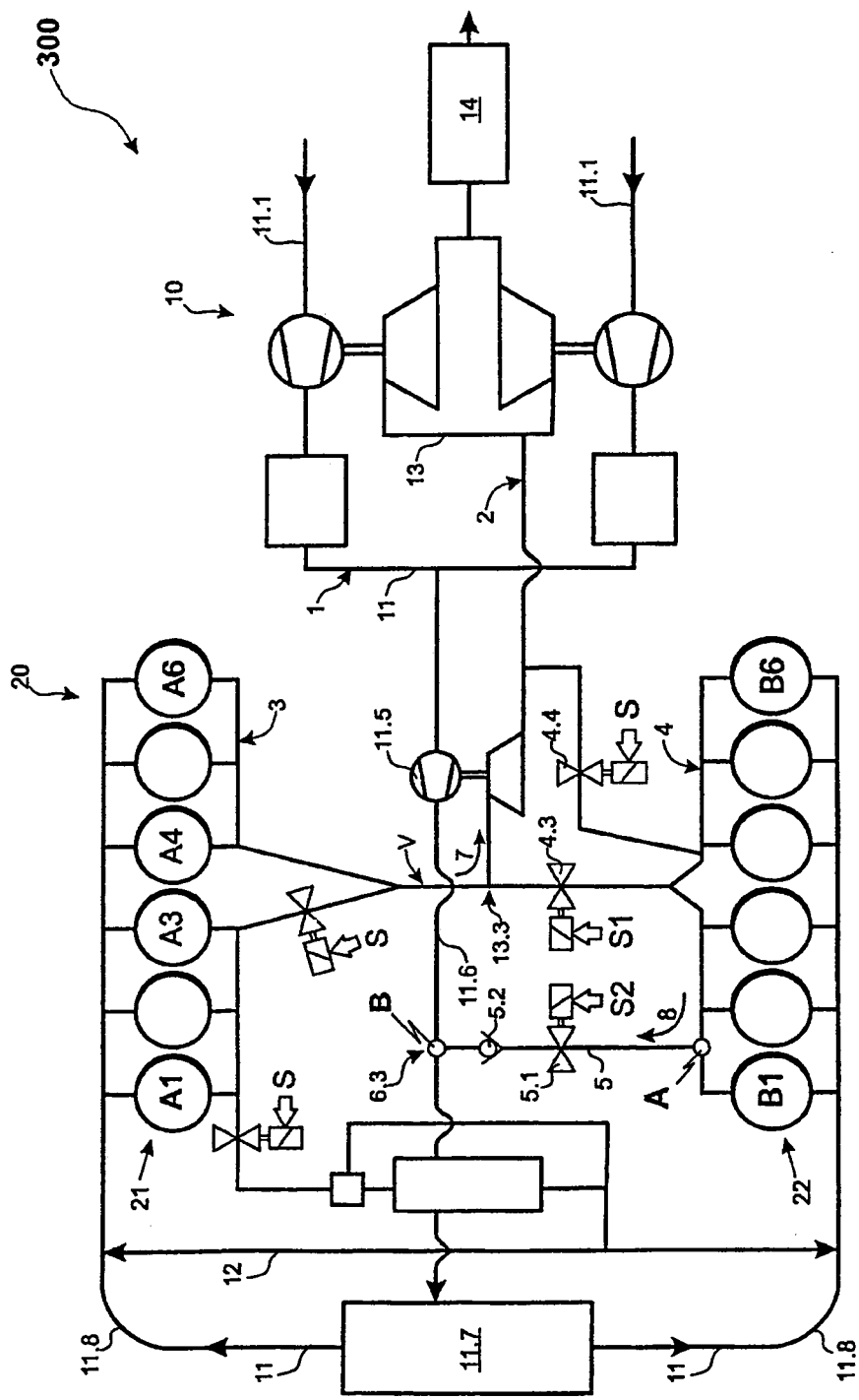
FIG. 3 shows schematically an internal combustion engine including a gas guide system according to a third embodiment of the invention.

FIG. 3 shows a third embodiment of a combustion power system 300. Like the combustion power system 200, the third embodiment is a modification of the invention in somewhat different respect. For the description of particulars, reference is made to the description of FIG. 2. Below mainly the differences with respect to the combustion power system 200 of FIG. 2 are described. In the combustion power system 300, the collection line 5 extends to a supply section 6.3 in the area of a connecting point B which is in the section of the fresh air supply line 11 of the gas supply line 1. The supply section 6.3 is arranged there in the area of a charge air section 11.6, that is, in the present case, downstream of the high-pressure compressor 11.5 of the fresh air supply line 11 and upstream of the charge air section 11.6, that is upstream of the high-pressure compressor 11.5 of the fresh air supply line 11 and upstream of the charge air cooler 11.7. The pressure level in the area of the charge air section 11.6 is herein still higher than in the fresh air supply sections 11.8 of the fresh air supply line 11 downstream of the charge air cooler 11.7. The pressure level in the area of the charge air section 11.6 is also higher than in the area of a fresh air section 11.1. For safe operation of the collection line 5 and for limiting the pressure at the gas valve 5.1, the collection line 5 is provided with a check valve 5.2.

During full engine operation, the combustion power system 300 functions like the combustion power system 100 or 200.

During partial engine operation of the combustion power plant 20, in the combustion power system 300, the second partial gas stream 8 from the second gas discharge line 4 is separated from the first partial gas stream 7 of the fired first cylinder bank 21 when the valves 4.3 and 4.4 are closed and, with the gas valve 5.1 open, is conducted via the check valve 5.2 to the supply section 6.3 in the charge air section 11.6 of the fresh air supply line 11. With the arrangement of the supply section 6.3 in the area of the charge air section 11.6 downstream of the high pressure compressor 11.5, the counter pressure is, upon induction of the second partial streams 8, higher than in the combustion power system 200 or the combustion power system 100. The modified embodiment according to the second embodiment of the invention in the form of the combustion power system 300 is, as a result, suitable for comparatively high pressures in the second partial gas stream 8 of the second gas discharge line 4, that is, actually for comparatively high pressures of the compressed discharge air of the unfired second cylinder bank 22. Since during partial engine operation, the exhaust gas valves 4.3 and 4.11 are closed only the first partial stream 7 from the first gas discharge line 3 is supplied directly to the exhaust gas treatment system 14, so that also during partial engine operation a comparatively high temperature is available for an effective exhaust gas treatment. The second partial gas stream 8 is first directed to the supply section 6.3 instead of the exhaust gas treatment system 14. Subsequently, the second initial gas stream 8 from the second gas discharge line 4 is supplied, together with the fresh air in the fresh air section 11, to the charge air cooler 11.7 and, possibly after admixture of re-circulated exhaust gas from the gas recirculation line 12, is supplied to the combustion engine 20.

Figure 4:
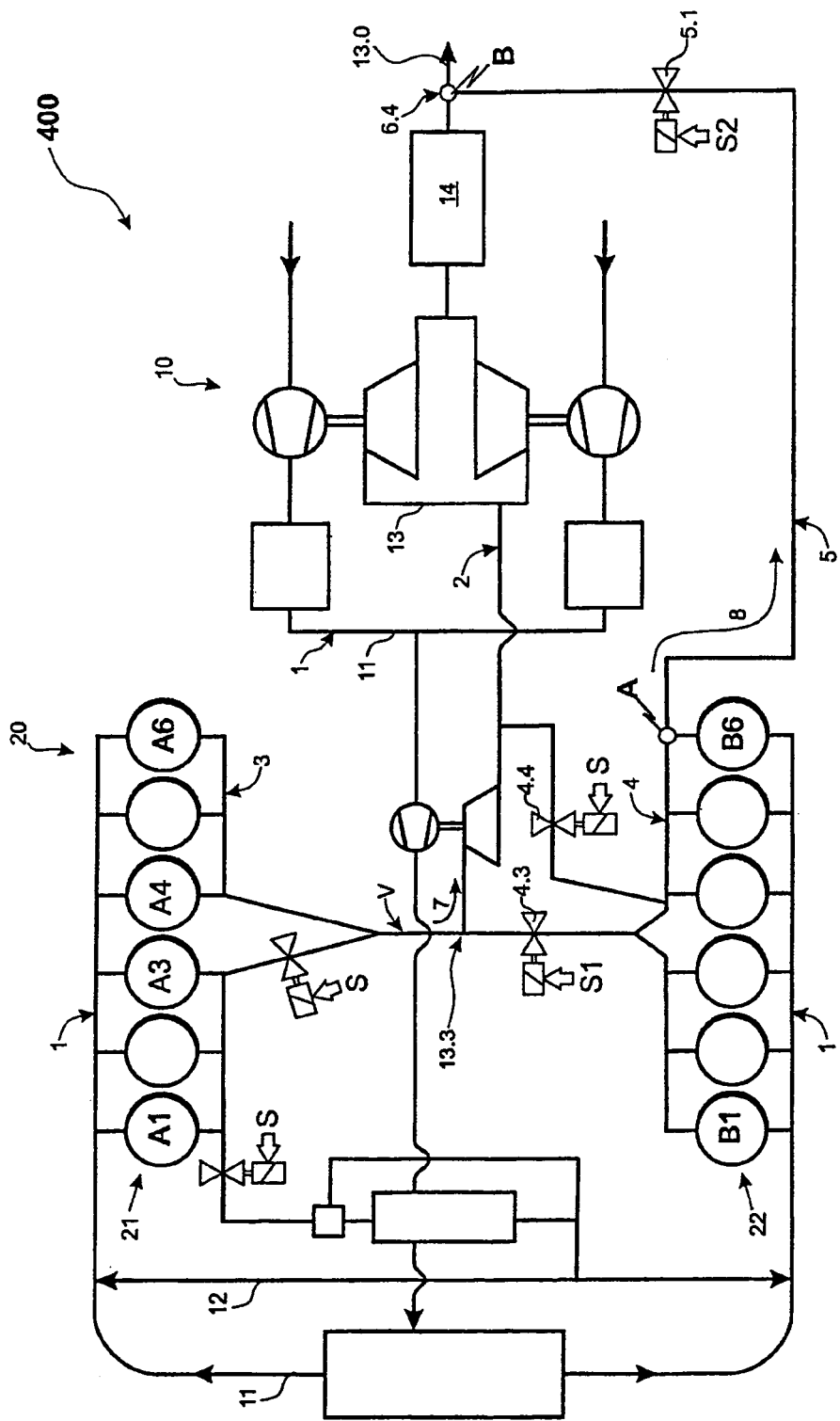
FIG. 4 shows schematically an internal combustion engine including a gas guide system according to a fourth embodiment of the invention.

FIG. 4 shows a fourth embodiment of a combustion power system 400 which is realized by a further development of the third embodiment by a simple modification. For a description of its functioning during full engine operation reference is made to the description of the combustion power systems 100, 200, 300.

For the partial engine operation, the second gas discharge line 4 of the combustion power systems 400 includes a collection line 5 which extends from the connection point A of the second gas discharge line 4 to a connecting point B of the downstream exhaust gas discharge line 2. The essential differences between the combustion power systems 100, 200, 300 is that, in the present case, the collection line 5 does not extend to the gas supply line 1 but to the downstream gas discharge line 2, more accurately to the connection point B in an exhaust line section 13.0 which is arranged downstream of the exhaust gas treatment system 14. The supply section 6.4 at the connecting point B is integrated into the exhaust gas line 13.0 which is connected to the exhaust gas treatment system 14. Because the relatively low pressure level present in the exhaust gas line 13.0, a check valve in the collection line 5 is not needed; only a gas valve 5.1 may be provided similar to the combustion power system 100.

During partial engine operation, the second partial gas stream 8 is separated from the first partial gas stream 7 by closure of the valves 4.3 and 4.4 that is a gas-conducting connection for the partial gas streams 7, 8 is closed. Instead, when the gas valve 5.1 is opened, the second partial stream 8 is conducted via the collection line 5 into the supply section 6.4 which is part of the exhaust line 13.0. In this way, during part engine operation, actually only the first partial gas stream 7 from the first gas discharge line 3 is supplied to an exhaust gas treatment system 14. The collection line 5 in this case has the function of a bypass line for bypassing the exhaust gas treatment system 14 by the second partial gas stream 8 from the second gas discharge line 4.

The function of a bypass line for the collection line 5 is in this case desirable only during partial engine operation. During full engine operation, it is ensured that the collection line 5 is closed by the gas valve 5.1. With a monitoring of the gas valve 5.1, it is ensured that an undesired execution of the bypass function via the collection line does not occur during full engine operation of the combustion power plant 20. To this end, a control connection for the gas valve 5.1 with a monitoring function, preferably by the engine control unit is provided. If necessary, the collection line 5 may be provided with an additional safety valve not shown, which closes during full engine operation and opens during partial engine operation. In addition, or alternatively, the gas valve 5.1 may, in connection with the monitoring function, also be so set that, in case of a malfunction, the gas valve 5.1 closes. In this way, it can be avoided during full engine operation, that exhaust gas from the fired cylinders B1 to B6 reaches the ambient air downstream of the exhaust gas treatment system 4. During partial engine operation, it may optionally also be provided that, in case of a malfunction of the gas valve 5.1, one of the valves 4.3 or 4.4 opens. With such a modified monitoring scheme, in an emergency, a failure causing the release of exhaust gases during full engine operation of the fired cylinders B1 to B6 can be avoided with a less disadvantageous partial engine operation of the internal combustion engine 20.

The combustion power system 400 can be realized in a comparatively simple way. It is suitable during partial engine operation for use with particularly low output pressures of the second partial gas stream 8 in the second exhaust gas discharge line 4 and in the collection line 5. A recirculation of the second partial gas stream 8 from the cylinders B1 to B6 of the second cylinder bank 22 which is unfired during partial engine operation to the combustion engine 20 is not provided by the combustion power system 400. In this fourth embodiment, the supply section 6.4 to which gas is supplied by the collection line 5 provides for the supply of discharge air from the cylinders B1 to B6 which are unfired during partial engine operation to the downstream exhaust gas discharge line 2 of the gas guide system 20.

Figure 5:
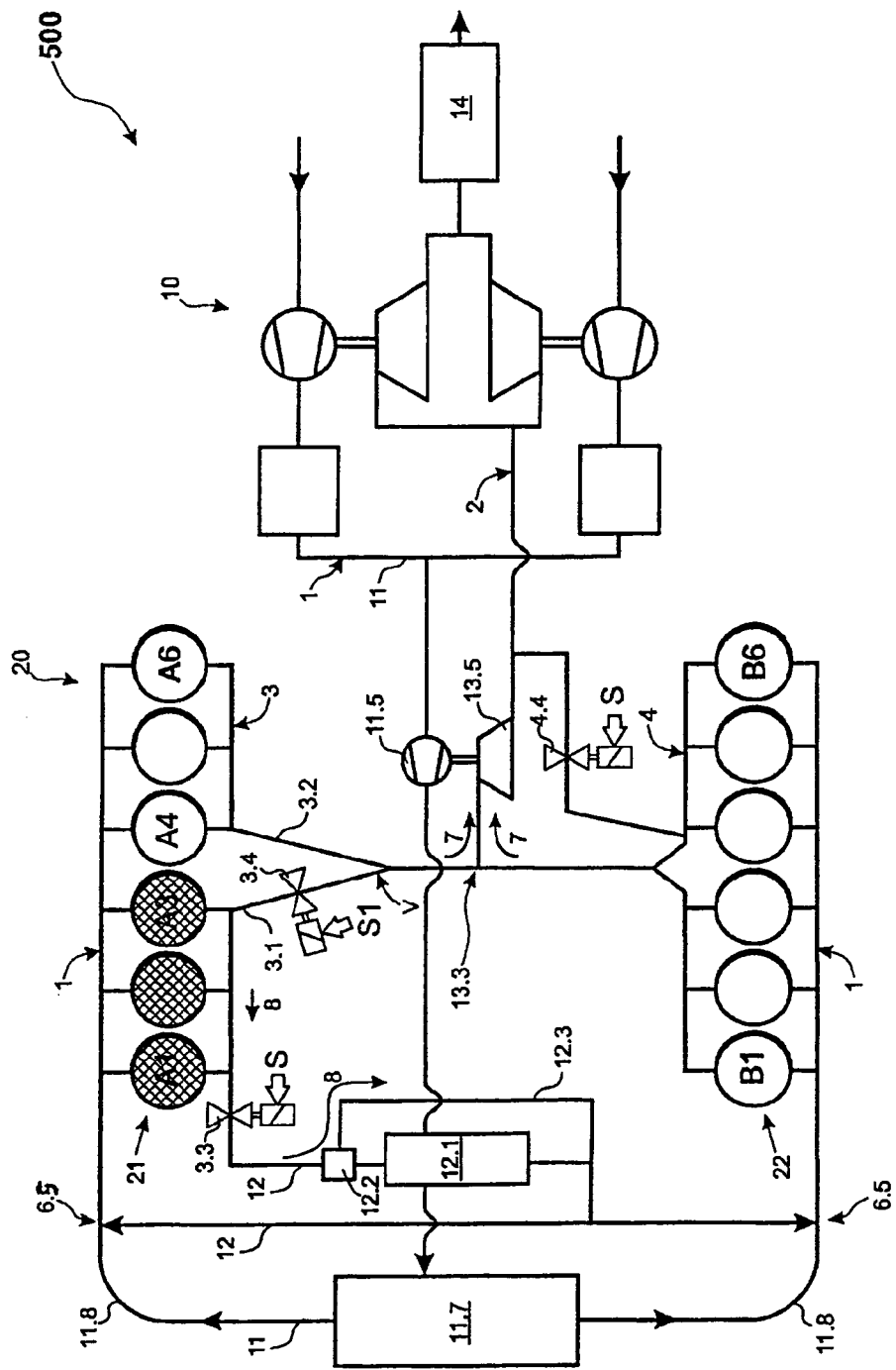
FIG. 5 shows schematically an internal combustion engine including a gas guide system according to a fifth embodiment of the invention.

FIG. 5 shows a fifth embodiment of a combustion power system 500 which essentially follows the concept of the fourth embodiment of the invention. This concept is based essentially on the so-called spender cylinder concept which has been described essentially in connection with FIG. 1. The combustion power system 500 can be operated during partial engine operation in two different ways. In a first operating mode, it is provided that, during partial engine operation, all cylinders A1 to A6 of the first cylinder bank 21 are unfired whereas fuel is injected into the cylinders B1 to B6 of the second cylinder bank 22. In this operating mode, the exhaust gas recirculation valve 3.4 is closed and the exhaust gas recirculation valve 3.3 is opened. The discharge air of the unfired spender cylinders A1 to A3 is therefore not supplied to the high pressure turbine 13.5 but to the bypass line 12.3 of the exhaust gas recirculation cooler 12.1. It is avoided in this way that the relatively cold discharge air of the spender cylinder A1 to A3 is mixed with the hot exhaust gas of the fired cylinder B1 to B6 of the second cylinder bank 22. Only the discharge gas of the cylinders A4 to A6 is mixed with the exhaust gas of the cylinders B1 to B6.

In the second operating mode, only the cylinders A1 to A3 of the cylinder bank 21 of the combustion engine 2 are operated unfired that is without fuel injection. In this embodiment therefore, the cylinders A1 to A3 form a second cylinder group which, during partial engine operation is operated without fuel injection while the cylinder A4 to A6 and B1 to B6 form a first cylinder group which is operated with fuel injection also during partial engine operation. During partial engine operation, in both modes of operation the first partial gas stream 7 of the cylinders A4 to A6 and B1 to B6 and the second partial gas stream 8 of the cylinders A1 to A3 is shown in FIG. 5.

The combustion power system 500 includes in accordance with the fourth variant a gas guide system 10 peripheral to the combustion engine 20. The exhaust gas discharge line 2 of the gas guide system 10 obtains, during full engine operation, a partial gas stream from a first gas discharge line 3 of the cylinders A1 to A6 of the first cylinder group 21 and a further partial gas stream from a second gas discharge line 4 of the cylinders B1 to B6 of the second cylinder group 22. During partial engine operation which is explained further below, only a first gas stream 7 is supplied to the downstream exhaust gas discharge line 2 in the second mode of operation, the first gas stream 7 comprising gas from the second branch 3.2 of the first gas discharge line 3 of the fired cylinders A4 to A6 of the first cylinder bank 21 and the second gas discharge line 4 of the cylinders B1 to B6 of the second cylinder bank 22. The gas guide system 10 again comprises an upstream gas supply line 1 and the mentioned downstream gas discharge line 2. The gas supply line 1 includes a fresh air supply section 11 and a gas recirculation line 12. The components included in the gas supply line 1 and the exhaust gas discharge line 2 such as compressors 11.2, 11.5 etc., and turbines 13.2, 13.5 are described in FIG. 1 to which reference is made herewith. In particular, also in the combustion power system 500, the exhaust gas recirculation line 12 is connected to the first branch 3.1 of the first gas discharge line 3 and is provided with an exhaust gas recirculation cooler 12.1 as well as an associated bypass line 12.3. By control of a bypass flap valve 12.2 or another suitable guide member a gas stream can be conducted either through the exhaust gas recirculation cooler 12.1 or the bypass line 12.3. The gas discharged via the second branch 3.1 is mixed in the partial section 11.8 via the gas recirculation line 12 with connection to the fresh air supply section 11 of the gas supply line 1 with charge air and supplied to the first cylinder group 21 and the second cylinder group 22 of the combustion engine 20 via the further course of the gas supply line 1.

The spender cylinder concept provides in accordance with the embodiment of the combustion power system 500 of FIG. 5 in this case in the second operating mode that, in contrast to full engine operation, during partial engine operation only an actual part of the cylinder bank, here the first cylinder bank 21, is unfired, that is, only a limited number of cylinders here the cylinders A1 to A3 of the first cylinder bank 21 are unfired. In the earlier described embodiments of combustion power system 100-400, all cylinders B1 to B6 of the second cylinder bank 22 were unfired during partial engine operation that is all the cylinders B1 to B6 of the second cylinder bank 22 which form the second cylinder group. The recognition of the fourth variant resides in that—based on the spender cylinder concept, sections or respectively valves of the first gas discharge line 3 and of the gas recirculation line 12 can take over the function of a collection line or, respectively, the function of a separation means in order to separate, during partial engine operation, in the second operating mode, discharge air from the unfired cylinders A1 to A3 from the comparatively hot exhaust gas of the fired cylinder A4 to A6 and B1 to B6. During partial engine operation, in combustion power systems 500, the first partial gas stream 7 in the second branch 3.2 of the first gas discharge line 3 as well as the second gas discharge line 4 can be separated from a second partial gas stream 8 in the first branch 3.1 of the first exhaust gas discharge line 3 and the exhaust gas recirculation line 12. During full engine operation with exhaust gas recirculation, the valve 3.3 is open and the valve 3.4 is opened. The first branch 3.1 serves, together with the part of the exhaust gas recirculation line 12 which is upstream of the bypass flap valve 12.2 and the bypass line 12.3 as collection line. The collection line conducts the second partial stream 8 from the spender cylinders A1 to A3, which are unfired during partial engine operation back to the gas supply line 1. To this end, the collection line is so designed that it extends to the supply section 6.5 which extends as part of the further gas recirculation line 12 to the part 11.8 of the fresh air supply line 11 which is arranged downstream of the charge air cooler. Actually, the second partial gas stream 8 of the spender cylinders A1 to A3 is re-circulated by way of the bypass line 12.3 to the fresh air supply line 11 downstream of the charge air cooler 11.7 when the exhaust gas recirculation valve 3.4 is closed while bypassing the exhaust gas recirculation cooler 12.1. In this way, the second partial stream 8 of the second cylinder group of cylinders A1 to A3 which are unfired during partial engine operation is again separated in the second mode of operation from the first partial stream 7 of the fired cylinders A4 to A6 and B1 to B6. In this way, the exhaust gas has at the exhaust gas treatment system 14, also during partial engine operation, a temperature which is sufficiently high to facilitate an effective operation of the exhaust gas treatment system 14. The exhaust gas treatment system 14 is supplied here directly with the first partial gas stream 7 of the second branch 3.2 and the second gas discharge line 4 only during partial engine operation. Advantageously in the embodiment of the combustion power system 500 of FIG. 5, there is no separate line as collection line provided whereas, in the combustion power systems 100 to 400 of the earlier mentioned embodiments in each case a separate line is provided for the collection line 5. The combustion power system which is based on the combustion power system 500 rather utilizes the branch 3.1 of the first gas discharge line 3 as well as the bypass line 12.3 of the exhaust gas recirculation line 12 for the collection of the second partial gas stream from the unfired cylinders A1 to A3. In addition, the concept of the fourth variant utilizes the exhaust gas recirculation valve 3.4 as separation means for the separation of the second partial gas stream 8 from the first partial gas stream 7 during partial engine operation. In addition, the further exhaust gas valve 3.3 is used for opening the collection line formed by the first branch 3.1, the bypass flap valve 12.2 and the bypass line 12.3 as well as the further section of the gas recirculation line 12. The second partial gas stream 8 is extended to supply section 11. Also, in the combustion power system 500, the second partial gas stream 8, in this case from the unfired cylinders A1 to A3, during partial engine operation is not mixed with the first partial gas stream 7, here from the cylinders A4 to A6 and the fired cylinders B1 to B6, is not mixed and/or supplied to the exhaust gas treatment system 14—rather in the concept of the fourth variant, the second partial gas stream 8 is immediately re-circulated to the combustion engine 20.

Figure 6:
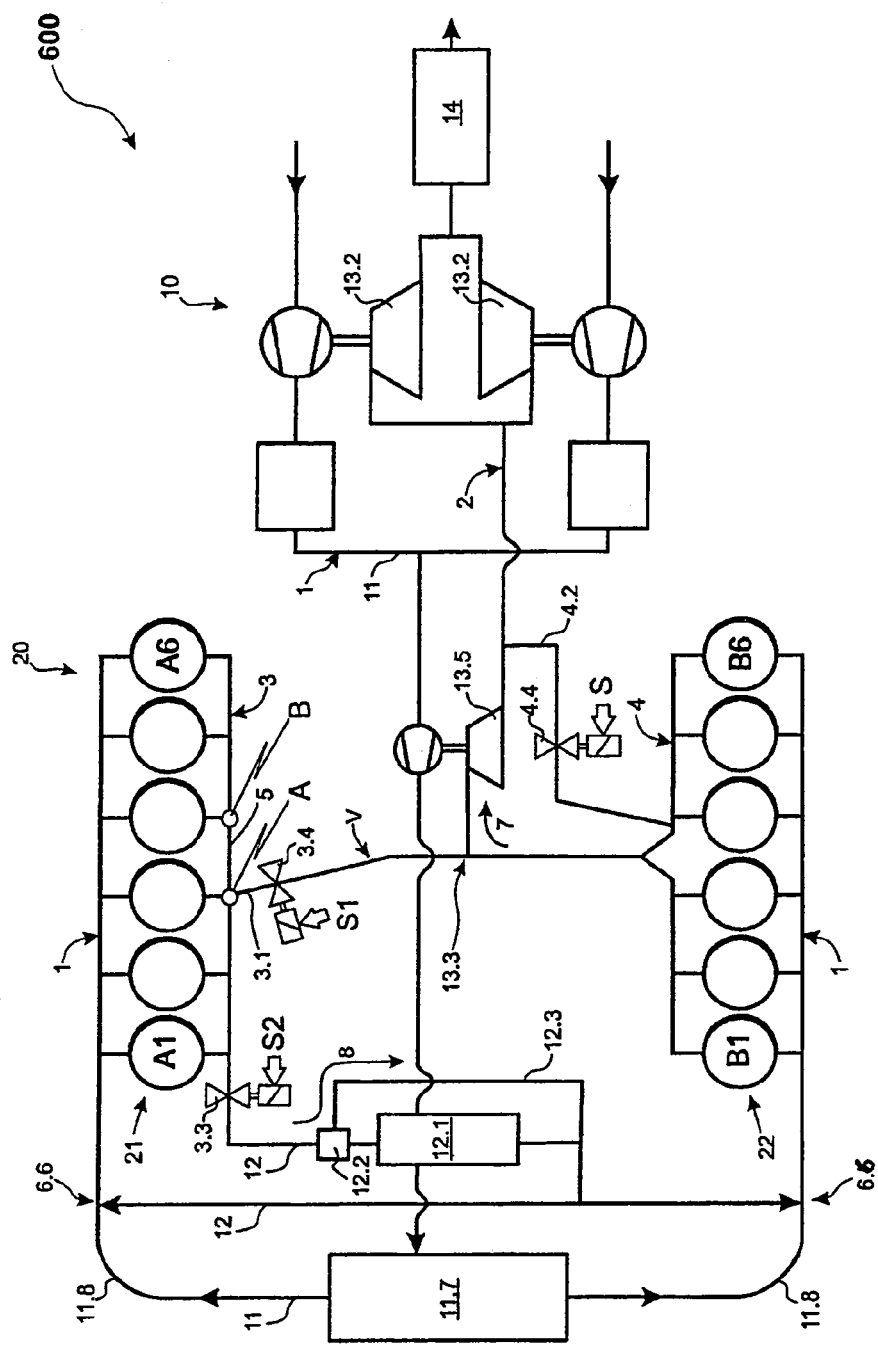
FIG. 6 shows schematically an internal combustion engine with a gas guide system according to a sixth embodiment of the invention.

FIG. 6 shows a modified embodiment of a combustion power system 600 which is based on the concept of the fourth variant of the invention. With an otherwise identical design of the combustion engine 20 and of the gas guide system 10 as shown in the combustion power system 500, in the combustion power system 600 the complete first cylinder bank 21 with cylinders A1 to A6 is unfired that is it is operated without fuel injection whereas the second cylinder bank 22 with the cylinders B1 to B6 is fired, that is, operated with fuel injection. The cylinders B1 to B6 form consequently the first cylinder group with fuel injection and the cylinders A1 to A6 form the second cylinder group without fuel injection during partial engine operation.

Also in the combustion power system 600 of FIG. 6—like in the combustion power system 500—it is provided that the exhaust gas recirculation line 12 assumes the function of a collection line for the second gas stream 8 of compressed discharge air from unfired cylinders during partial engine operation utilizing the bypass line 12.3. However, in the combustion power system 600, it concerns all the cylinders A1 to A6 of the first cylinder bank 21. In addition,—since in this case, all the cylinders A1 to A6 of the first cylinder bank 21 are unfired during partial engine operation—a collection line 5 is provided between the connecting points A and B of the first gas discharge line 3. In this way, the second gas stream 8 can be effectively conducted to the supply section 6.6 in the area 11.8 of the fresh air supply line 11 of the gas supply system 1. During, partial engine operation, the exhaust gas recirculation valve 3.4 assumes the function of a separation means separating the second partial gas stream 8 from the unfired cylinders A1 to A6 of the first cylinder bank 21 during partial engine operation from the first partial gas stream 7 of the fired cylinders B1 to B6 of the second cylinder bank 22. A recirculation section of the second partial stream 8 is formed by sections of the first branch 31 of the first gas discharge line 3 and the additional collection line 5 between the connecting points A and B. The recirculation section further comprises— with the second separation means in the form of the exhaust gas recirculation valve 3.3 open—the further gas recirculation line 12 up to the supply section 6.6, in particular the bypass flap valve 12.2 and the bypass line 12.3.

Like the combustion power system 500, also the combustion power system 600 uses an exhaust gas recirculation line 12 to establish a recirculation of the second partial gas stream 8 from unfired cylinders to the combustion engine 20 which is separate from the first partial gas stream 7 from the fired cylinders. In contrast to the combustion power system 500, advantageously in the combustion power system 600 a complete cylinder bank 21 that is the cylinder group formed by the cylinders A1 to A6 can remain unfired during partial engine operation so that all the advantages of partial engine operation can be utilized. In the combustion power system 600, during partial engine operation, only the first partial gas stream of the second gas discharge line 4 is supplied to an exhaust gas treatment system 14. In this way, temperatures are obtained in the exhaust gas treatment system 14, which are sufficiently high for an effective regeneration operation. The additional collection line 5 between the connecting points A and B of the combustion power system 600 and the additional gas valve 3.5 for establishing the separation means (together with the exhaust gas recirculation valve 3.4) can be retrofitted relatively easily.

During full engine operation of the combustion power system 600, the high pressure turbine 13.5 can be operated with the valve 4.4 closed. Also with the valve 4.4 closed, the partial gas stream from the cylinders B1 to B6 can at least partially be supplied directly to the low pressure turbine 13.2 bypassing the high pressure turbine.

The valve 3.4 operating as first separating means as well as the valve 3.3 operating as second separating means is controlled by an engine control unit for switching between full engine operation and partial engine operation of the combustion power system 20 using control values S1, S2. Also, the gas valve 4.4 can be controlled by a motor control unit depending on the engine operating load by control values S for directing a first partial gas stream to the high pressure turbine 13.5 or when necessary to bypass the high pressure turbine 13.5.

Figure 7:
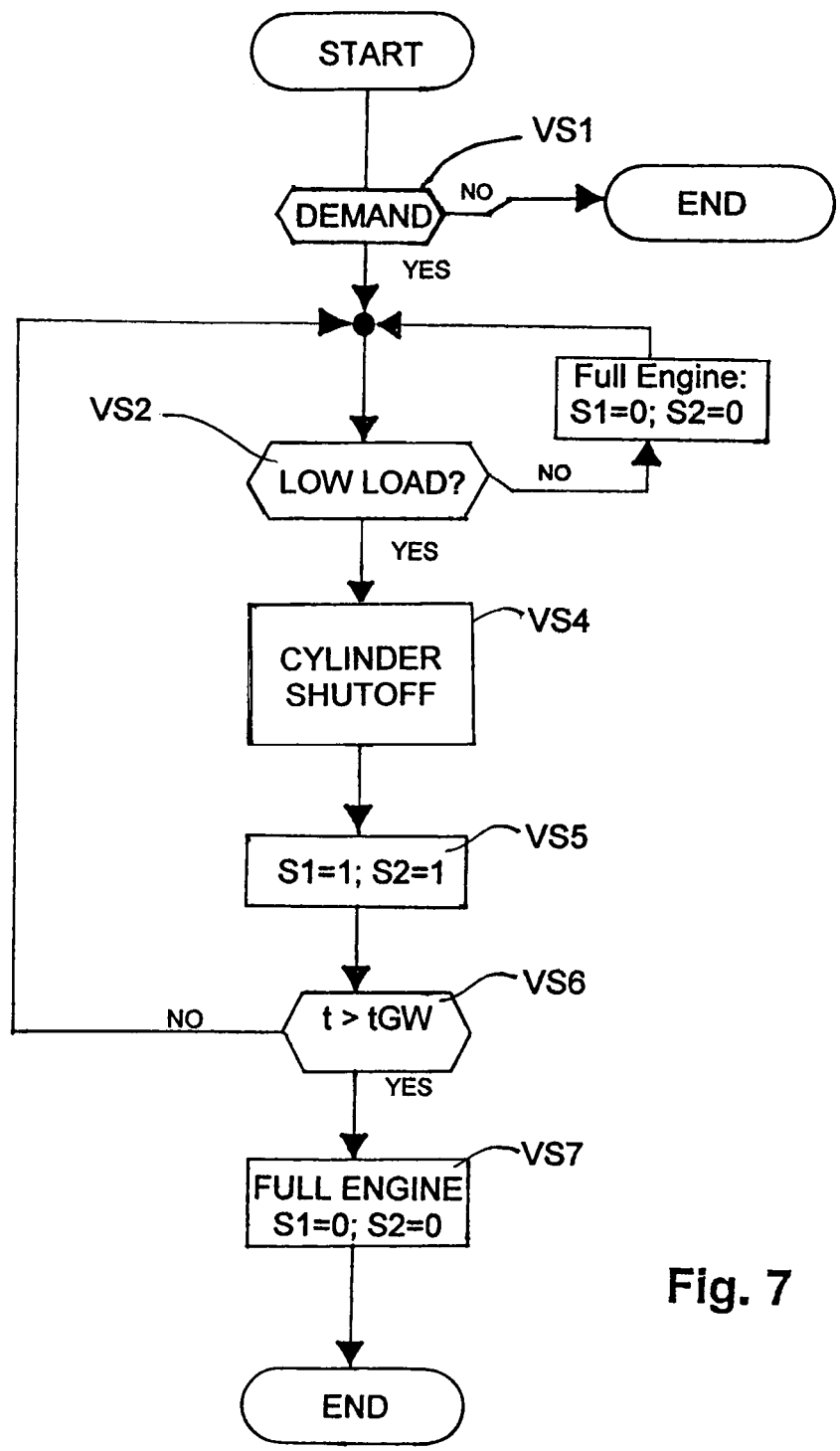
FIG. 7 shows a flow diagram of the method of operating a gas guide system in connection with an internal combustion engine as shown in FIGS. 1 to 6.

A flow diagram for explaining a switching procedure between full engine operation and partial engine operation of the combustion engine 20 in the combustion power systems 100, 200, 300, 400, 500, 600 is shown in FIG. 7. After startup of a combustion power system 20, it is first determined in an operational step VS1 whether there is a need for a temperature increase of the exhaust gas treatment system. As long as there is no such demand the routine for executing the procedure is terminated. The present method is therefore continued only when a need is indicated by an exhaust gas treatment system control unit. When a stationary operating point has been reached it is possible to examine in method steps VS2, VS3, VS4, VS5, whether—at low load—the combustion power plant 20, that is the large diesel engine, is to be brought to a partial engine operating state or a full engine operating state. To this end, it is determined in the operating step VS2 whether the combustion engine 20 is in a low load state or in an idling state. A criterion for a low load state may be for example that the torque M (injection amount) of the engine is below a certain limit value or an average pressure pME is below a certain limit value. If it is then recognized that no low load state is present the combustion engine 20 can be further operated with full engine operation which is represented in the process step VS3. In the present case to this end, a control value S1 and S2 is set to zero. The control value S1 and S2 is here in FIG. 1 to FIG. 6 shown as input to a control connection of the first or, respectively, the second separation means, namely, the valves 4.3, 3.4 or respectively, the valves 5.1, 3.3. The size of a control value S1 and S2 at zero for full engine operation is, with respect to FIG. 1 to FIG. 6, connected with a demand for opening the valve (4.3, 3.4) addressed by the control value S1 and for closing of the valve (5.1) addressed by the control value S2. In this state, with full engine operation, a collection line 5 or respectively a recirculation line forming a collection line (FIG. 5, FIG. 6) of the gas guide system 10 remains closed. The first gas discharge line 3 as well as the second gas discharge line 4 are opened in order to supply exhaust gas from all fired cylinders A1 to A6 (except spender cylinders A1 to A3) and B1 to B6 via the exhaust gas discharge line to the exhaust gas treatment system 14.

If on the other hand, low load operation is recognized in the method step VS2, cylinders may be switched off in the step VS4 and, subsequently, or at the same time, the first and second separation means are switched over in the operating step VS5. The states of the control values S1=1 and S2=1 shown therein mean that the valve (4.3, 3.4) addressed with S2 opens. As a result, a collection line 5 or, respectively, a recirculation line of the gas guide system 10 (FIG. 5, FIG. 6) effecting the function of the collection line opens. In this way, a first partial gas stream 7 from the fired cylinders is separated from a second partial gas stream 8 from the unfired cylinders and the second partial gas stream 8 is supplied to a collection line/recirculation section in order to possibly supply it again at a supply section to the gas guide system 10. Herein, following the concept of the invention, it is ensured that only the first partial gas stream 7 is directly supplied to an exhaust gas treatment system so that at the exhaust gas treatment system 14 generally a temperature is present which is sufficiently high for an effective operation of the exhaust gas treatment system. The second partial gas stream 8 may either be returned to combustion engine like in the systems 100, 200, 300 and 600, or—like in combustion power system 400—supplied to the exhaust gas discharge line 2 downstream of the exhaust gas treatment system 14.

In this way, combustion power systems 100-600 operated with low load during partial engine operation have the advantage that, with the same effective engine power output, correspondingly more fuel is injected into the fired cylinders so that the same power output is obtained as with full engine operation. The duration of the partial engine operation can be examined in connection with a control method, for example by a timer, in the method step VS6 in a routine repetition after given periods. Here it is examined in the method step VS6, whether a time counter has exceeded a certain time limit value GW. As long as this is not the case it is either examined whether the low load state continues. If a certain time limit value GW is exceeded, it is here provided in connection with the control method of FIG. 7 to return, in the method step VS7, again to full engine operation. To this end, the control values S1 and S2 are again set to zero. In this way, the valve (4.3, 3.4) is addressed with S1 that is, the first separation means is opened and the valve (5.1, 3.3) that is the second separation means, in the collection line/recirculation section, is closed.

| Listing of Reference numerals | |
|---|---|
| 1 | Gas supply arrangement |
| 2 | Exhaust gas discharge line |
| 3 | First gas discharge line |
| 3.1 | First branch |
| 3.2 | Second branch |
| 3.3, 3.4 | Exhaust gas recirculation valve |
| 4 | Second gas discharge line |
| 4.1 | First branch |
| 4.2 | Second branch |
| 4.3, 4.4 | Exhaust gas valve |
| 5 | Collection line |
| 5.1 | Gas valve |
| 5.2 | Check valve |
| 6.0-6.6 | Supply section |
| 7 | First partial gas stream |
| 8 | Second partial gas stream |
| 10 | Gas guide system |
| 11 | Fresh air supply section line |
| 11.1 | Fresh air supply section |
| 11.2 | Low pressure compressor |
| 11.3 | Intercooler |
| 11.4 | Charge air section |
| 11.5 | High pressure compressor |
| 11.6 | Further charge air section |
| 11.7 | Charge air cooler |
| 11.8 | Further fresh air supply section |
| 12 | Recirculation line |
| 12.1 | Exhaust gas recirculation cooler |
| 12.2 | Bypass valve |
| 12.3 | Bypass line |
| 13 | Exhaust line |
| 13.0 | Exhaust line section |
| 13.1 | Section ahead of exhaust gas treatment system |
| 13.2 | Low pressure turbines |
| 13.3 | Connection |
| 13.4 | Line section |
| 13.5 | High pressure turbine |
| 14 | Exhaust gas treatment system |
| 20 | Internal combustion engine |
| 21 | First cylinder bank |
| 22 | Second cylinder bank |
| 100-600 | Combustion engine system |
| A1-A6 | Cylinders of the first cylinder bank |

-continued

Listing of Reference numerals

| | |
|---|---|
| B1-B6 | Cylinders of the second cylinder bank |
| A, B, C | Connecting points |
| S, S1, S2 | Control values |
| VS1-VS7 | Method steps |
| V | Gas conducting connection |

What is claimed is:

1. A gas guide system (10) for a combustion engine (20) for guiding gas of the combustion engine (20), the engine having first and second groups (21, 22) of cylinders, said system comprising:
    a gas supply arrangement (1) for supplying gas to the combustion engine (20),
    a gas discharge system (2) including an exhaust gas treatment unit (14) for releasing gas from the combustion engine (20),
    a first gas discharge line (3) for discharging a first partial gas stream (7) from at least one cylinder (A1-A6) of a first cylinder group (21), and
    a second gas discharge line (4) for discharging a second partial gas stream (8) from at least one cylinder (B1-B6, A1-A3) of a second cylinder group (22) wherein, during partial engine operation of the combustion engine (20) in which the at least one cylinder (A1-A6) of the first cylinder group (21) is operable with fuel injection and the at least one cylinder (B1-B6, A1-A3) of the second cylinder group (22) is operated without fuel injection,
    the first gas discharge line (3) and the second gas discharge line (4) being interconnected via a gas conducting connection (V) which includes a first separation means designed for blocking the connection (V) during partial engine operation of the combustion engine (20) and the second gas discharge line (4) including a collection line (5) which is in communication with a supply section (6.0, 6.1, 6.2, 6.3, 6.4, 6.5, 6.6) of the gas guide system (10) so that, during partial engine operation, at least part of the second partial gas stream (8) is supplied to the supply section instead of the exhaust gas treatment unit (14).

2. The gas guide system according to claim 1, wherein the first separation means including at least one of an exhaust gas valve (4.3, 4.4) and an exhaust gas recirculation valve (3.3, 3.4) is provided for opening the gas-conducting connection (V) between the first gas discharge line (3) and the second gas discharge line (4) during full engine operation in which all cylinders are fired.

3. The gas guide system according to claim 1, wherein the collection line (5) includes a second separation means (5.1) for opening the collection line (5) during partial engine operation and for closing the collection line (5) during full engine operation.

4. The gas guide system according to claim 3, wherein at least one of the first separation means (4.3), the exhaust gas recirculation valve (3.3, 3.4) and the second separation means (5.1) is in the form of a valve and the collection line (5) includes an additional check valve (5.2).

5. The gas guide system according to claim 1, wherein at least one of the first gas discharge line (3) and the second gas discharge line (4) is connected downstream to the exhaust gas discharge system (2) at a common connection (13.3).

6. The gas guide system according to claim 1, wherein the gas supply arrangement (1) includes a fresh air supply line (11) for supplying fresh air to the combustion engine (20), the fresh air supply line including a fresh air supply section (11.1) upstream of a compressor (11.2) and a charge air section (11.4) downstream of the compressor (11.2) and, in particular, a further charge air section (11.6) downstream of another compressor (11.5).

7. The gas guide system according to claim 1, wherein the gas supply arrangement (1) includes a gas recirculation line (12) for re-circulating discharge gas to the combustion engine (20), the gas recirculation line (12) being in communication with at least one of the first and the second gas discharge line (3.4).

8. The gas guide system according to claim 1, wherein the exhaust gas discharge line (2) includes an exhaust line section (13.0) downstream of the exhaust gas treatment unit (14).

9. The gas guide system according to claim 6, wherein the fresh air supply section (11) of the gas supply arrangement includes a first and a second compressor (11.2, 11.5).

10. The gas guide system according to claim 6, wherein the supply section (6.0) is arranged in the charge air section (11.4) between the first and the second compressor (11.2, 11.5) of the gas supply arrangement (1).

11. The gas guide system according to claim 1, wherein the supply section (6.1, 6.2, 6.3) is arranged in a charge air section (11.4, 11.6, 11.8) downstream of at least one of a first and a second compressor (11.2, 11.5) and also downstream of a charge air cooler.

12. The gas guide system according to claim 1, wherein the gas supply section (6.4) is arranged in the exhaust gas discharge line (2) in a line section (13.0) downstream of the exhaust gas treatment unit (11).

13. The gas guide system according to claim 1, wherein a gas recirculation line (12) of the gas supply arrangement includes a bypass line (12.3) extending around an exhaust gas recirculation cooler (12.1) arranged in the exhaust gas recirculation line (12).

14. The gas guide system according to claim 13, wherein the supply section (6.5, 6.6) is arranged in a further fresh air supply section (11.8) downstream of the exhaust gas recirculation cooler (12.1) and downstream of a charge air cooler (11.7).

15. The gas guide system according to claim 13, wherein the first separation means is in the form of an exhaust gas recirculation valve (3.4) arranged in the second branch (3.2) and the second separation means is in the form of an exhaust gas recirculation valve (3.3) arranged in the recirculation lien (12) of the gas supply arrangement (1).

16. A combustion power system (100, 200, 300, 400, 500, 600) comprising a combustion engine (20) including a gas guide system (10) arranged on the periphery of the engine, said system comprising:
    a gas supply arrangement (1) for supplying gas to the combustion engine (20),
    a gas discharge system (2) including an exhaust gas treatment unit (14) for releasing gas from the combustion engine (20), and
    a first gas discharge line (3) for discharging for discharging a first partial gas stream (7) from at least one cylinder (A1-A6) of a first cylinder group (21), and
    a second gas discharge line (4) for discharging a second partial gas stream (8) from at least one cylinder (B1-B6, A1-A3) of a second cylinder group (22, part of 21) wherein, during partial engine operation of the combustion engine (20) in which the at least one cylinder (A1-A6) of the first cylinder group is operable with fuel injection and the at least one cylinder (B1-B6, A1-A3) of the second cylinder group is operated without fuel injection, the first gas discharge line (3) and the second gas discharge line (4) being interconnected via a gas conducting connection (V) which includes a first separation means designed for blocking the connection (V) during partial engine operation of the combustion engine (20), the discharge gas from the fired and the unfired cylinders being separated during partial engine operation and only the discharge gas from the fired cylinders being supplied to the exhaust gas treatment unit so as to provide for a temperature of the treatment unit which is sufficiently high to ensure its operation and the second gas discharge line (4) including a collection line (5) which is in communication with a supply section (6.0, 6.1, 6.2, 6.3, 6.4, 6.5, 6.6) of the gas guide system (10) so that, during partial engine operation, at least part of the second partial gas stream (8) is supplied to the supply section instead of the exhaust gas treatment unit (14).

17. A method of operating a combustion power system (100, 200, 300, 400, 500, 600) according to claim 1 including a gas guide system (10) for guiding the gas of the combustion engine (20) at the periphery of the engine, said method comprising the steps of:

supplying gas to the combustion engine (20), discharging gas from the combustion engine via a gas treatment unit (14), wherein a first partial gas stream (7) is discharged from at least one cylinder (A1-A6) of a first cylinder group and a second partial gas stream (8) is discharged from at least one cylinder (B1-B6, A1-A3) of a second cylinder group, and during partial engine operation of the combustion engine (20) the at least one cylinder (A1-A6) operating the first cylinder group with fuel injection and operating the at-least one cylinder (B1-B6, A1-A3) of the second cylinder group without fuel injection, and keeping the first partial gas stream (7) and the second partial gas stream (8) are kept separated and supplying at least a part of the second partial gas stream (8) to a supply section (6.0, 6.2, 6.3, 6.4, 6.5, 6.6) of the as guide system (10) rather than to the exhaust gas treatment unit (14) for returning it to the gas supply arrangement for re-supplying the gas to the combustion engine (20).

18. The method according to claim 17, wherein, during full engine operation of the combustion engine (20), the cylinders (B1-B6, A1-A3) of the second cylinder group are all operated with fuel injection and the first partial stream and the second partial stream are combined.

* * * * *